United States Patent
Park

(10) Patent No.: US 8,347,130 B2
(45) Date of Patent: Jan. 1, 2013

(54) LOW-POWER SYSTEM-ON-CHIP

(75) Inventor: Jinkwon Park, Suwon-si (KR)

(73) Assignee: Samsung Electronics Co., Ltd. (KR)

( * ) Notice: Subject to any disclaimer, the term of this patent is extended or adjusted under 35 U.S.C. 154(b) by 399 days.

(21) Appl. No.: 12/658,183

(22) Filed: Feb. 4, 2010

(65) Prior Publication Data

US 2010/0205467 A1    Aug. 12, 2010

(30) Foreign Application Priority Data

Feb. 6, 2009  (KR) .................. 10-2009-0009840

(51) Int. Cl.
  *G06F 1/32* (2006.01)
(52) U.S. Cl. ....................... 713/320; 713/300
(58) Field of Classification Search .................. 713/300, 713/320
  See application file for complete search history.

(56) References Cited

U.S. PATENT DOCUMENTS

| | | | |
|---|---|---|---|
| 6,400,643 B1 | 6/2002 | Setogawa | |
| 6,949,950 B2 * | 9/2005 | Takahashi et al. | 326/37 |
| 7,039,819 B1 * | 5/2006 | Kommrusch et al. | 713/322 |
| 7,275,167 B2 | 9/2007 | Chandley et al. | |
| 7,941,682 B2 * | 5/2011 | Adams | 713/322 |
| 2002/0047742 A1 | 4/2002 | Setogawa | |
| 2003/0167413 A1 * | 9/2003 | Stachura et al. | 713/300 |
| 2007/0067658 A1 | 3/2007 | Chandley et al. | |
| 2007/0083785 A1 * | 4/2007 | Sutardja | 713/323 |
| 2009/0204835 A1 * | 8/2009 | Smith et al. | 713/323 |
| 2009/0204837 A1 * | 8/2009 | Raval et al. | 713/330 |

FOREIGN PATENT DOCUMENTS

| KR | 1996-0024954 A | 7/1996 |
|---|---|---|
| KR | 10-2008-0038943 A | 5/2008 |

* cited by examiner

*Primary Examiner* — Paul Yanchus, III
*Assistant Examiner* — Zahid Choudhury
(74) *Attorney, Agent, or Firm* — Onello & Mello LLP

(57) ABSTRACT

A system-on-chip comprises a power-off domain block; and a power-on domain block that analyzes externally transferred data during a power-down state of the power-off domain block, wherein the power-on domain block executes an operation of the power-off domain block or a wake-up operation, based on an analyzed result of the externally transferred data.

4 Claims, 7 Drawing Sheets

LOW-POWER SYSTEM-ON-CHIP

CROSS-REFERENCE TO RELATED APPLICATIONS

This application claims priority under 35 U.S.C §119 to Korean Patent Application No. 10-2009-0009840 filed Feb. 6, 2009 in the Korean Intellectual Property Office (KIPO), the contents of which are incorporated herein by reference in their entirety.

BACKGROUND

1. Field

Exemplary embodiments relate to integrated circuits, and more particularly, to a low-power system-on-chip (SoC).

2. Description of Related Art

Home appliances and office equipment such as printers and the like are generally powered without sanctions. However, as the need to conserve energy increases, there is a desire to power home appliances and office equipment using low-power techniques. To satisfy the need to reduce energy, low-power techniques for reducing power in home appliances and office equipment are available.

One such technique is to place a low-power condition on home appliances and office equipment where power is consumed on the order of around several hundred milliwatts (mW) when the home appliances or office equipment are in a standby state. Accordingly, one low-power technique is to reduce the power consumed by a system-on-chip (SoC) used in the home appliances and office equipment.

Reduction of power consumption of the system-on-chip may be accomplished by reducing static power consumption and/or dynamic power consumption. To reduce power during an operation of the system-on-chip, the static power may be reduced by lowering an operating clock frequency. Since static power is consumed by leakage current that occurs when a voltage is applied, even when the system-on-chip is not performing an operation, static power consumption may be reduced by powering down a block on the system-on-chip when it is not used.

SUMMARY

One aspect of embodiments of the inventive concept is directed to a system-on-chip which comprises a power-off domain block; and a power-on domain block that analyzes externally transferred data during a power-down state of the power-off domain block, wherein the power-on domain block executes at least one of an operation of the power-off domain block and a wake-up operation, based on an analyzed result of the externally transferred data.

In an embodiment, the power-off domain block receives power in response to the wake-up operation.

In an embodiment, the power-off domain block is powered down in a power-save mode.

In an embodiment, the power-off domain block comprises a main CPU; and a memory controller that controls an external memory responsive to a control of the main CPU.

In an embodiment, the power-off domain block further comprises:
a plurality of intellectual properties that perform individual functions; an interrupt controller that transfers an interrupt generated by at least one of the plurality of intellectual properties to the main CPU; and a system bus that interconnects the main CPU, the memory controller, the plurality of intellectual properties, and the interrupt controller.

In an embodiment, the power-off domain block further comprises the system bus comprises a power isolation cell that isolates an interconnection between the power-down domain block and the power-on domain block during the power-down state.

In an embodiment, the power-on domain block comprises a low-power management module that performs an operation of the main CPU during the power-down state; a wake-up intellectual property that analyzes data; a keep-alive intellectual property that activates power of the power-off domain block according to a result analyzed by the wake-up intellectual property; and a plurality of internal memories that are accessed by the plurality of intellectual properties, respectively.

In an embodiment, the wake-up intellectual property comprises:
a PHY block that receives data transferred from the external; and a LINK block that analyzes the data received by the PHY block according to a protocol.

In an embodiment, when the received data is stored in at least one of the internal memories, the power-on domain block substitutes an operation of the power-off domain block.

In an embodiment, when the received data is a signal indicating a standby state of the power-off domain block, the power-on domain block substitutes an operation of the power-off domain block.

Another aspect of embodiments of the inventive concept is directed to a system-on-chip which comprises a power-off domain block including a main CPU; and a power-on domain block including a low-power CPU and a memory, wherein the memory is used as an auxiliary memory of the power-off domain block at a power-on mode and as a memory storing programs and data for the low-power CPU at a power-off mode; and wherein the power-on domain block analyzes externally transferred data during a power-down state of the power-off domain block to substitutes an operation of the power-off domain block, based on the analyzed result.

In an embodiment, when the system-on-chip satisfies a power-down condition, programs and data to be used by the low-power CPU are copied to the memory of the power-on domain block, the power-off domain block is powered down, and the low-power CPU is booted up.

In an embodiment, interconnection between the power-down domain block and the power-on domain block is isolated at power-down.

In an embodiment, the power-on domain block is powered constantly.

Another aspect of embodiments of the inventive concept is directed to a system-on-chip which comprises a power-off domain block including a main CPU; a memory controller that controls an external memory responsive to a control of the main CPU; a plurality of intellectual properties that perform individual functions; an interrupt controller that transfers an interrupt generated by at least one of the plurality of intellectual properties, to the main CPU; and a system bus that interconnects the main CPU, the memory controller, the plurality of intellectual properties, and the interrupt controller; and a power-on domain block including a low-power management module that performs an operation of the main CPU during a power-off state; a wake-up intellectual property that analyzes data; a keepalive intellectual property that activates a power of the power-off domain block according to a result analyzed by the wake-up intellectual property; and internal memories used as an auxiliary memory of the power-off domain block at a power-on mode and as a memory storing programs and data for the low-power CPU at a power-off mode.

In an embodiment, when the system-on-chip satisfies a power-down condition, programs and data to be used by the low-power CPU are copied to at least one of the internal memories, the power-off domain block is powered down, and the low-power CPU is booted up.

BRIEF DESCRIPTION OF THE FIGURES

The foregoing and other features and advantages of the inventive concepts will be apparent from the more particular description of preferred embodiments of the inventive concepts, as illustrated in the accompanying drawings in which like reference characters refer to the same parts throughout the different views. The drawings are not necessarily to scale, emphasis instead being placed upon illustrating the principles of the inventive concepts. In the drawings, the thickness of layers and regions are exaggerated for clarity. In the drawings.

DETAILED DESCRIPTION OF EMBODIMENTS

Figure 1:
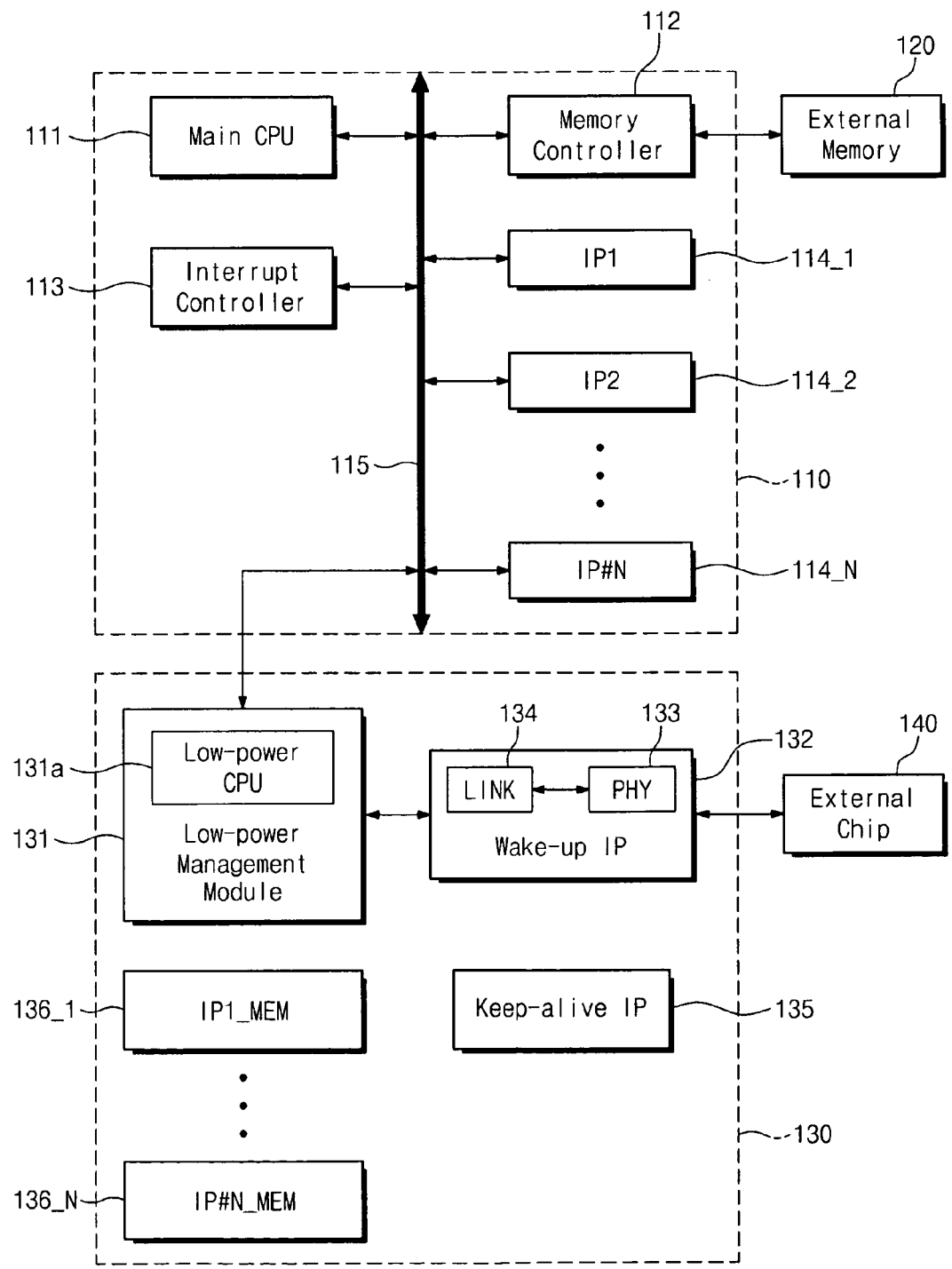
FIG. 1 is a block diagram illustrating a system-on-chip according to an embodiment.

Various embodiments of the invention will be hereinafter described in detail with reference to the accompanying drawings. The inventive concept may however be embodied in different forms and should not be construed as limited to the embodiments set forth herein. Rather, these embodiments are provided so that this disclosure will be thorough and complete, and will fully convey the scope of the embodiments to those skilled in the art. Like reference numerals refer to like elements throughout the accompanying figures.

As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It will be understood that when an element or layer is referred to as being "on," "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present.

Although the terms first, second, and the like may be used in this specification to describe respective components or sections, these terms are used for clear description and these components or sections are not limited by these terms.

FIG. 1 is a block diagram illustrating a system-on-chip according to an embodiment of the inventive concepts.

Referring to FIG. 1, a system-on-chip 100 according to an embodiment of the inventive concept may include a power-off domain block 110 arranged and configured to connect and communicate with an external memory 120 and a power-on domain block 130 arranged and configured to connect and communicate with an external electronic component, such as an external chip 140.

The power-off domain block 110 may be powered down so that low power is realized by the system-on-chip 100. The power-on domain block 130 may be powered on to perform one or more functions of the power-off domain block 110 while the block 110 is powered down, such functions being otherwise performed by the power-off domain block 110 when powered on.

The power-down domain block 110 may include a main CPU 111, an interrupt controller 113, a memory controller 112, a plurality of intellectual properties (IPs) 114_1 to 114_N, also referred to as intellectual property modules, intellectual property blocks, or intellectual property cores, and a system bus 115, also referred to herein as a power-off system bus. The main CPU 111 may control the memory controller 112 to access the external memory 120. The memory controller 112 may transfer data stored in the external memory 120 to the system bus in response to the control of the main CPU 111. The interrupt controller 113 may inform the main CPU 111 whether an interrupt (or, event) occurs in the IPs 114_1 to 114_N. Each of the IPs 114_1 to 114_N may perform one or more operations according to the features and functions of the system-on-chip 100. The IPs 114_1 to 114_N may, in an operation, access inherent internal memories 136_1 to 136_N, respectively, which, in an embodiment, can be positioned in the power-on domain block 130.

The power-on domain block 130 may include a low-power management module 131, a wake-up IP 132, a keepalive IP 133, and the inherent internal memories 136_1 to 136_N, each corresponding to the IPs 114_1 to 114_N.

An access operation of the IPs 114_1 to 114_N with regard to the internal memories 136_1 to 136_N will be more fully described with reference to FIGS. 2 to 4. The low-power management module 131 may include a low-power CPU 131a, described in detail below with reference to FIG. 4. The low-power management module 131 may determine whether to wake up the power-off domain block 110 according to data transferred from the wake-up IP 132.

In an operation that includes waking up the power-off domain block 110, the power-off domain block 110 is powered on in response to an input of data received from an external source. Prior to performing a wake-up operation, the power-off domain block is in a standby state, wherein power to the power-off domain block 110 is turned off or powered down, thereby reducing power consumption of the system-on-chip 100. That is, in a wake-up operation, the system-on-chip transitions from a standby state to a power-on state (or, an operating state).

The wake-up operation includes a wake-up process that may include determining a wake-up source and deciding whether it is performed and further deciding the manner in which it is performed on each wake-up source. The wake-up process may selectively determine which blocks on the system-on-chip 100 are powered down. In an embodiment, in response to the wake-up process, most blocks in the system-on-chip 100 are not powered down and the remaining blocks are powered down. This will be more fully described with reference to FIGS. 6 and 7.

The wake-up IP 132 may include a PHY block 133 and a LINK block 134. The wake-up IP 132 may provide an interface between the low-power management module 131 and the external chip 140. The PHY block 133 may transmit and receive data in practice, and the LINK block 134 may transmit and receive data, transferred from and to the PHY block 133, to and from the low-power management module 131. Detailed description of the PHY and LINK blocks 133 and 134 will be made with reference to FIGS. 2 to 5.

The keepalive IP 135 may determine a wake-up operation of the wake-up IP 132, specifically, to activate or inactivate power of the power-off domain block 110.

The system-on-chip 100 according to an embodiment of the inventive concept may reduce static power by grouping the main CPU 111, the memory controller 112, and the system bus 115 into the power-off domain block 110.

The low-power management module 131 may receive data from at least one of the plurality of IPs 114_1 to 114_N via the system bus 115. In the event that the data is transferred without processing, instead of the main CPU 111, the low-power management module 131 may store the data in an internal memory, for example, internal memory 136_1-136_N, corresponding to an IP of the plurality of IPs 114_1 to 114_N. In an embodiment, internal memories 136_1-136_N can be used as auxiliary memories of the power-off domain block 110 in a power-on mode and/or as memories for storing programs and data for the low-power CPU 131a in a power-down mode.

The low-power management module 131 may use the internal memories 136_1 to 136_N of the plurality of IPs to perform the above-described operation. That is, the low-power management module 131 may store program and data for changing over the function of the main CPU 111 in the internal memories 136_1 to 136_N. An access operation of the low-power management module 131 to the internal memories 136_1 to 136_N will be more fully described with reference to FIG. 4.

The internal memories 136_1 to 136_N may be accessed by corresponding IPs in a power-on mode and by the low-power management module 131 in a power-save mode.

Figure 2:
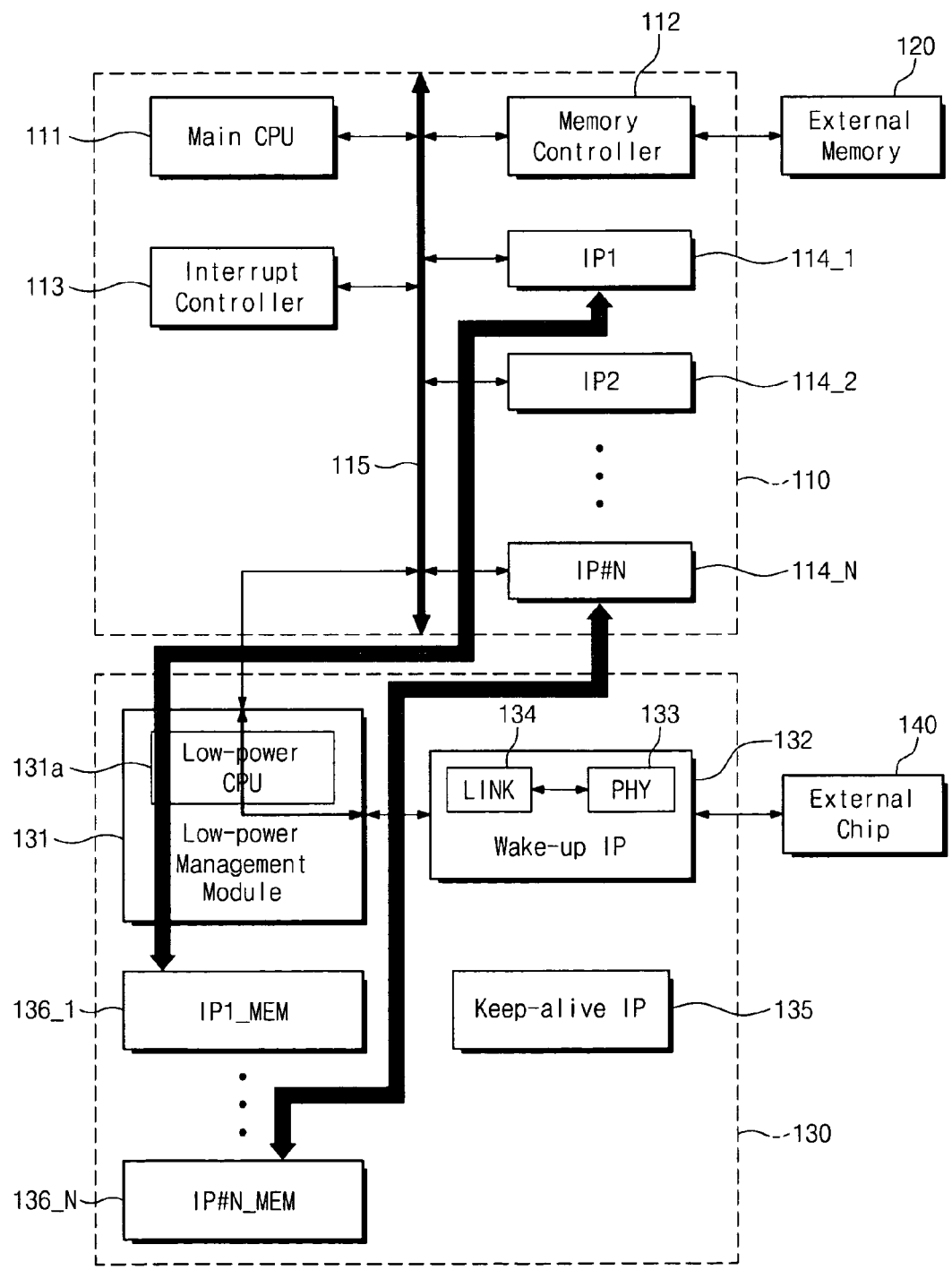
FIG. 2 is a block diagram illustrating a power-on mode of a system-on-chip illustrated in FIG. 1.

FIG. 2 is a block diagram of a power-on mode of a system-on-chip illustrated in FIG. 1.

Constituent elements in FIG. 2, which are identical with those in FIG. 1, are marked by the same reference numerals, and description thereof is thus omitted. In FIG. 2, there is illustrated an operation carried out when a power-off domain block 110 is in a power-on state.

Referring to FIG. 2, a system-on-chip 100 according to an embodiment of the inventive concept may provide power to all blocks, in particular, a power-off domain block 110 and a power-on domain block 130, when in a power-on mode. In an embodiment, IP 114_1 may access an internal memory 136_1, and IP 136_N may access an internal memory 136_N. A PHY block 133 may send data transferred from an external chip 140 to a link block 134. The link block 134 may analyze the data transferred from the PHY block 133, and transfer a result of the analyzed data to a low-power management module 131. The low-power management module 131 may transfer the received result to a main CPU 111 of the power-off domain block 110 via a system bus 115. Accordingly, the low-power management module 131 may perform a role of transferring data.

Figure 3:
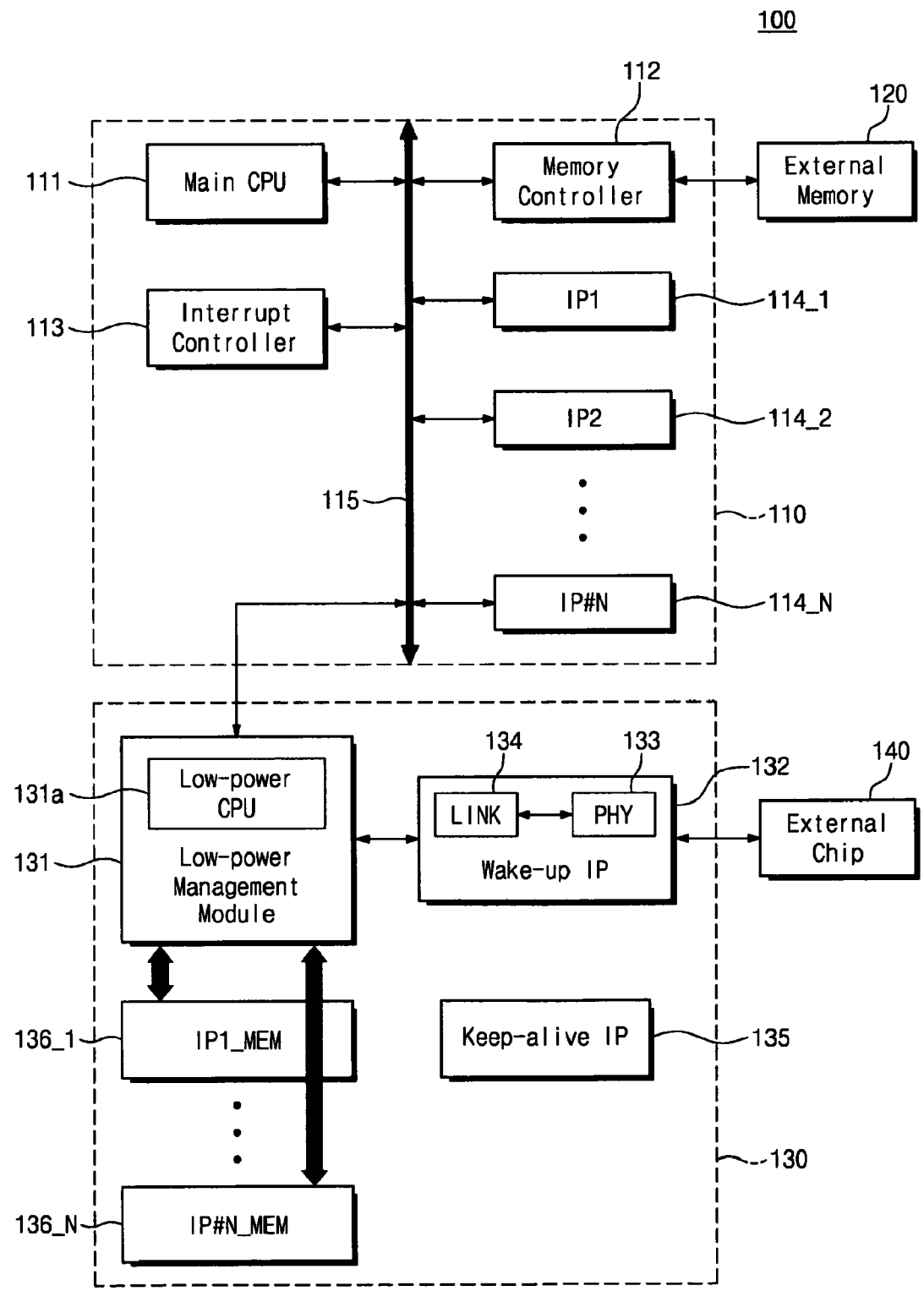
FIG. 3 is a block diagram illustrating a power-save mode of a system-on-chip illustrated in FIG. 1.

FIG. 3 is a block diagram of a power-save mode of a system-on-chip illustrated in FIG. 1.

Constituent elements in FIG. 3, which are identical with those in FIG. 1, are marked by the same reference numerals, and description thereof is thus omitted. In FIG. 3, there is illustrated an operation carried out when a power-off domain block 110 is in a power-off state.

Referring to FIG. 3, a system-on-chip 100 according to an embodiment of the inventive concept may interrupt or prevent power to a power-off domain block 110 in the power-save mode.

In the power-save mode, a low-power management module 131 may access internal memories 136_1 to 136_N. A PHY block 133 may provide a LINK block 134 with data transferred from an external chip 140. The LINK block 134 may analyze the provided data to determine whether to transfer the analyzed result to the low-power management module 131.

The low-power management module 131 may determine whether the transferred data indicates a wake-up condition. If the transferred data is determined to indicate the wake-up condition, the keepalive IP 135 may wake up the power-off domain block 110. If the transferred data is judged not to indicate the wake-up condition, the low-power CPU 131a may process the transferred data instead of the main CPU 111.

A wake-up execution process according to embodiments of the inventive concept may occur in the following cases:

CASE 1: a PHY block 133 detects at least one of a state in which there is transferred data following a protocol supported by the wake-up IP 132 and a state in which the PHY block 133 receives no transferred data.

CASE 2: there are detected at least one of a state in which there is transferred data following a protocol supported by the wake-up IP 132 and a state in which no data is transferred when a LINK block 134 operates.

CASE 3: there are detected at least one of a state in which there is transferred data following a protocol supported by the wake-up IP 132 and a state in which no data is transferred when the PHY bock 133, the LINK block 134, and the main CPU 111 operate.

The first case may be such a case that the PHY block 133 is capable of detecting t transferred data following a protocol supported by the wake-up IP 132 and detecting when there is no transferred data.

In this case, during a standby state (that is, a power-save mode), the PHY block 133 of the wake-up IP 132, and the keepalive IP 135 may be powered on, while remaining blocks, such as the power-off domain block 110, may be powered off. If data transmission is detected, the PHY block 133 may provide the keepalive IP 135 with detection information. The keepalive IP 135 may wake up the system-on-chip 100 so as to be set to a power-on state. Accordingly, it is possible to prevent static power consumption by reducing leakage current.

In general, the PHY block 133 may comprise an analog logic circuit. Thus, since a digital logic circuit and a power domain are divided, it is easy to realize that the PHY block 133 includes an analog logic circuit.

The second case, i.e., CASE 2, may be a case where the PHY block 133 and the LINK block 134 are capable of detecting when there is transferred data following a protocol supported by the wake-up IP 132 and when no data is transferred.

The PHY block 133 may receive data from an external chip 140. The LINK block 134 may detect whether the received data indicates a wake-up condition. If the received data is determined not to indicate the wake-up condition, the LINK block 134 may send the detection information to the keepalive IP 135. The keepalive IP 135 may ensure that the system-on-chip 100 is powered on and, if not, the keep-alive IP 135 may wake up the system-on-chip 100. Thus, it is possible to prevent static power consumption by reducing leakage current. The above-described case is associated with a complex wake-up condition. Since it is difficult to process the received data via the PHY block 133, the LINK block 134 may be configured to perform the above-described functions.

The third case, i.e. CASE 3, may be such a case that the PHY block 133, the LINK block 134, and the main CPU 111 are capable of detecting when there is transferred data following a protocol supported by the wake-up IP 132 and when no data is transferred.

In an embodiment, the PHY block 133 may receive data from the external chip 140. The LINK block 134 may analyze the received data to generate an interrupt. If an interrupt is made by the LINK block 134, the main CPU 111 may judge whether the result analyzed by the LINK block 134 indicates a wake-up condition.

If the result analyzed by the LINK block 134 is judged to indicate a wake-up condition, the main CPU 111 may provide wake-up information to the keepalive IP 135. The keepalive IP 135 may ensure that the system-on-chip 100 is powered on. Thus, it is possible to prevent static power consumption by reducing leakage current.

In accordance with the third case, the main CPU 111, a memory controller 112, an interrupt controller 113, and a system bus 115 must be powered on. Since most elements of the system-on-chip 100 are powered on, a leakage current may be generated. Thus, data is checked to determine whether data received from the external chip 140 must be transferred to, and processed by, the main CPU 111.

For example, in the event that data from the external chip 140 is stored in an internal memory 136_1 corresponding to the first IP 114_1, an operation of the main CPU 111 is unnecessary. Likewise, in the event that data in the internal memory 136_1 is transferred to the external chip 140, an operation of the main CPU 111 is unnecessary. In this case, the main CPU 111 may be maintained in a power-off state.

The system-on-chip 100 according to an embodiment of the inventive concept may include a low-power CPU 131a which performs a function of the main CPU 111 instead. Since the main CPU 111 is physically large and generally operates at a high speed, it may consume significant power regardless of whether it is in a standby state or an operating state. Thus, the low-power CPU 131a may perform simple data transfer operations with regard to the external chip 140 instead of requiring the main CPU 111 to perform these operations.

Since a system bus 115 is connected with elements such as the main CPU 111, a plurality of IPs 114_1 to 114_N, an interrupt controller 113, a memory controller 112, etc., it may consume significant power in order to transfer data when in standby and operating states. Thus, the system bus 115 may include a power isolation cell (PIC), which isolates an interconnection between the power-on domain block and the power-off domain block, for example, during the power-down state. The power isolation cell PIC will be more fully described with reference to FIG. 5.

Figure 4:
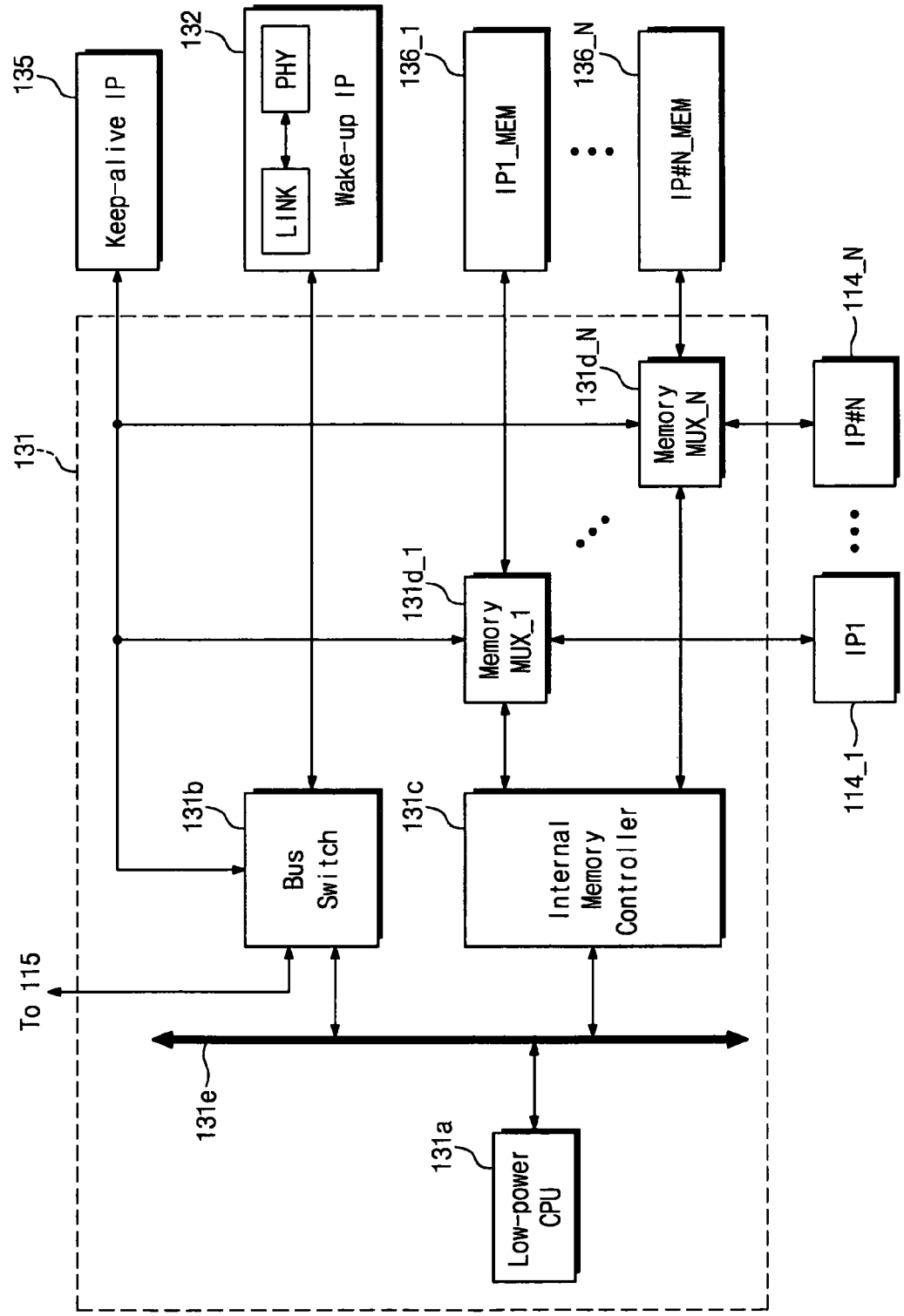
FIG. 4 is a block diagram of a low-power management module illustrated in FIG. 1.

FIG. 4 is a block diagram of a low-power management module 131 illustrated in FIG. 1.

Referring to FIG. 4, the low power management module 131 may include a low-power CPU 131a, a bus switch 131b, an internal memory controller 131c, a plurality of memory multiplexers 131d_1 to 131d_N, and a low-power management module bus 131e.

The low-power CPU 131a may process a simple operation instead of a main CPU 111, for example, depending on the power mode of a power-off domain block 110 in view of the cases described above. The bus switch 131b may be controlled by a keepalive IP 135 and determine whether data from the external chip 140 is transferred to the low-power CPU 131a via the module bus 131e or to the main CPU 111 via the system bus 115.

The internal memory controller 131c may access internal memories 136_1 to 136_N via the memory multiplexers 131d_1 to 131d_N, respectively. The keepalive IP 135 may provide control such that the IPs 114_1 to 114_N access the internal memories 136_1 to 136_N during a power-on mode and such that the low-power CPU 131a accesses the internal memories 136_1 to 136_N during a power-save mode.

Figure 5:
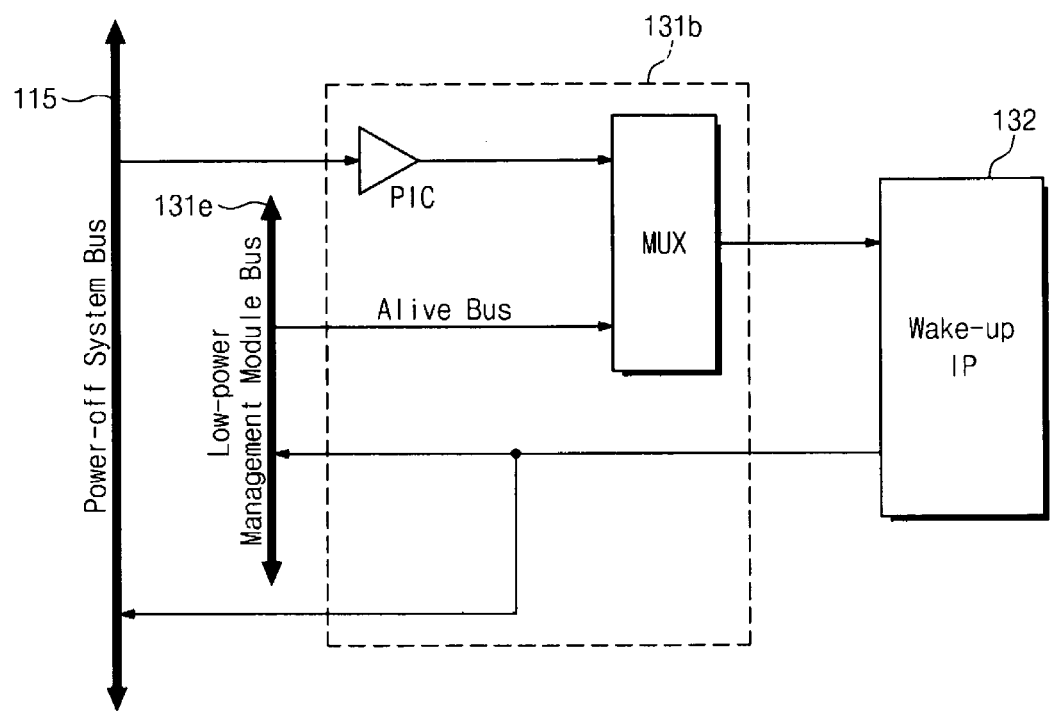
FIG. 5 is a block diagram of a bus switch illustrated in FIG. 4.

FIG. 5 is a block diagram of the bus switch 131b illustrated in FIG. 4.

Referring to FIGS. 4 and 5, the bus switch 131b according to an embodiment of the inventive concept may include a power isolation cell PIC and a multiplexer MUX.

The bus switch 131b may switch a connection between a power-off system bus 115 and a low-power management module bus 131e, which may be constantly in a power-on state.

The power isolation cell PIC may isolate a connection with the system bus 115 in a power-save mode to prevent leakage current of the system bus 115. That is, the power isolation cell PIC may prevent the leakage current by floating an input of the system bus 115. The multiplexer MUX may selectively connect the low-power management module bus 131e and/or a powered-off system bus 115 to a wake-up IP 132. That is, in a power-save mode, the module bus 131e is connected to the wake-up IP 132 via the multiplexer MUX. In the power-on mode, the system bus 115 is connected with the wake-up IP 132 via the multiplexer MUX.

Figure 6:
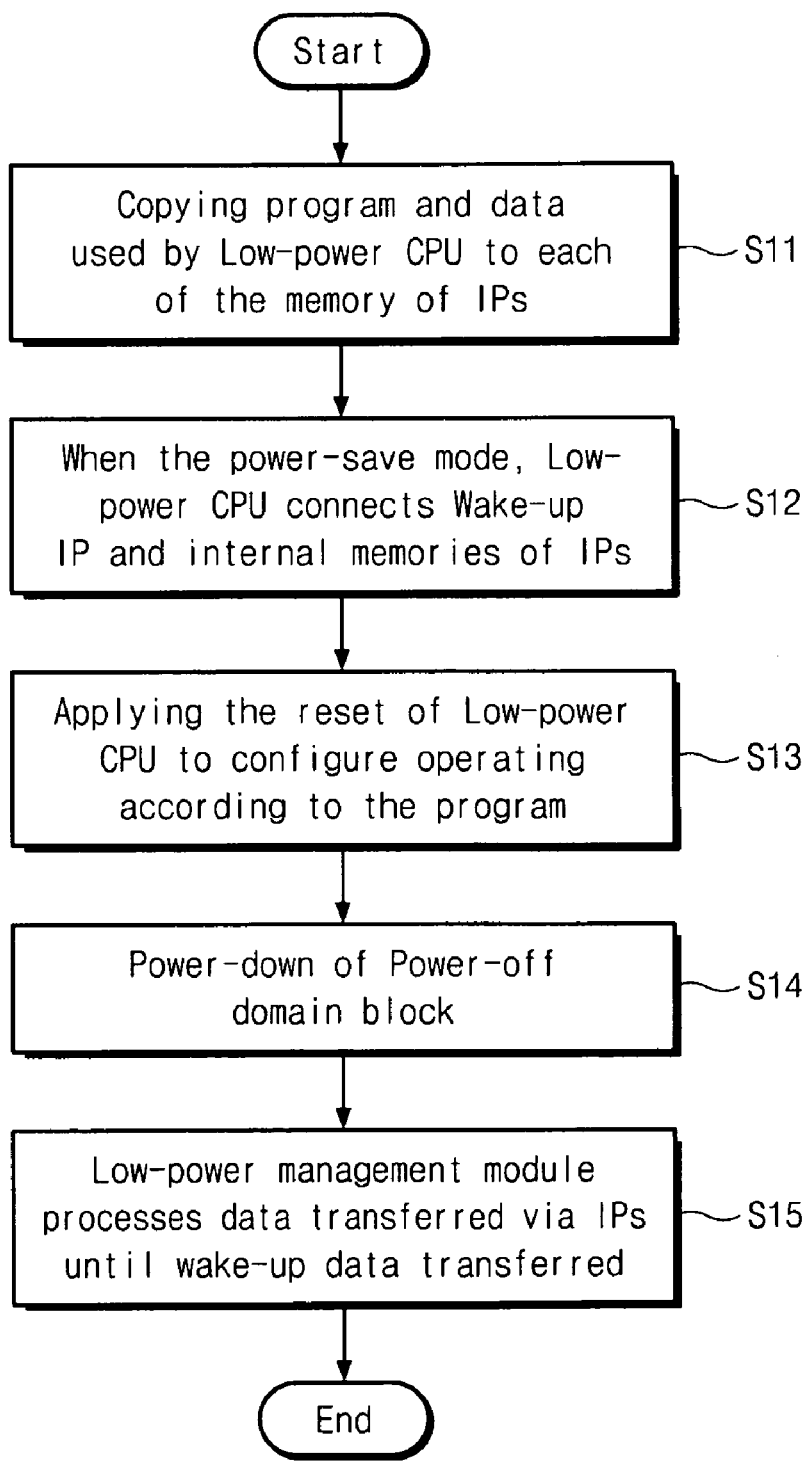
FIG. 6 is a flowchart describing an operation of a system-on-chip in FIG. 1 at power-down.

FIG. 6 is a flowchart describing an operation of a system-on-chip in FIG. 1 at power-down. Below, a power-down operation of a system-on-chip 100 according to an embodiment of the inventive concept will be described with reference to FIGS. 1 to 6.

In step S11, low-power program and data to be used by a low-power CPU 131a may be stored in internal memories 136_1 to 136_N. In case of a power-save mode, in step S12, the low-power CPU 131a may access a wake-up IP 135 and the internal memories 136_1 to 136_N. In step S13, the low-power CPU 131a may be set to operate according to the low-power program after reset. In step S14, a power-off domain block 110 of the system-on-chip 100 may be powered down. In step S15, a low-power management module 131 may process data transferred to IPs 114_1 to 114_N until wake-up data is received.

Figure 7:
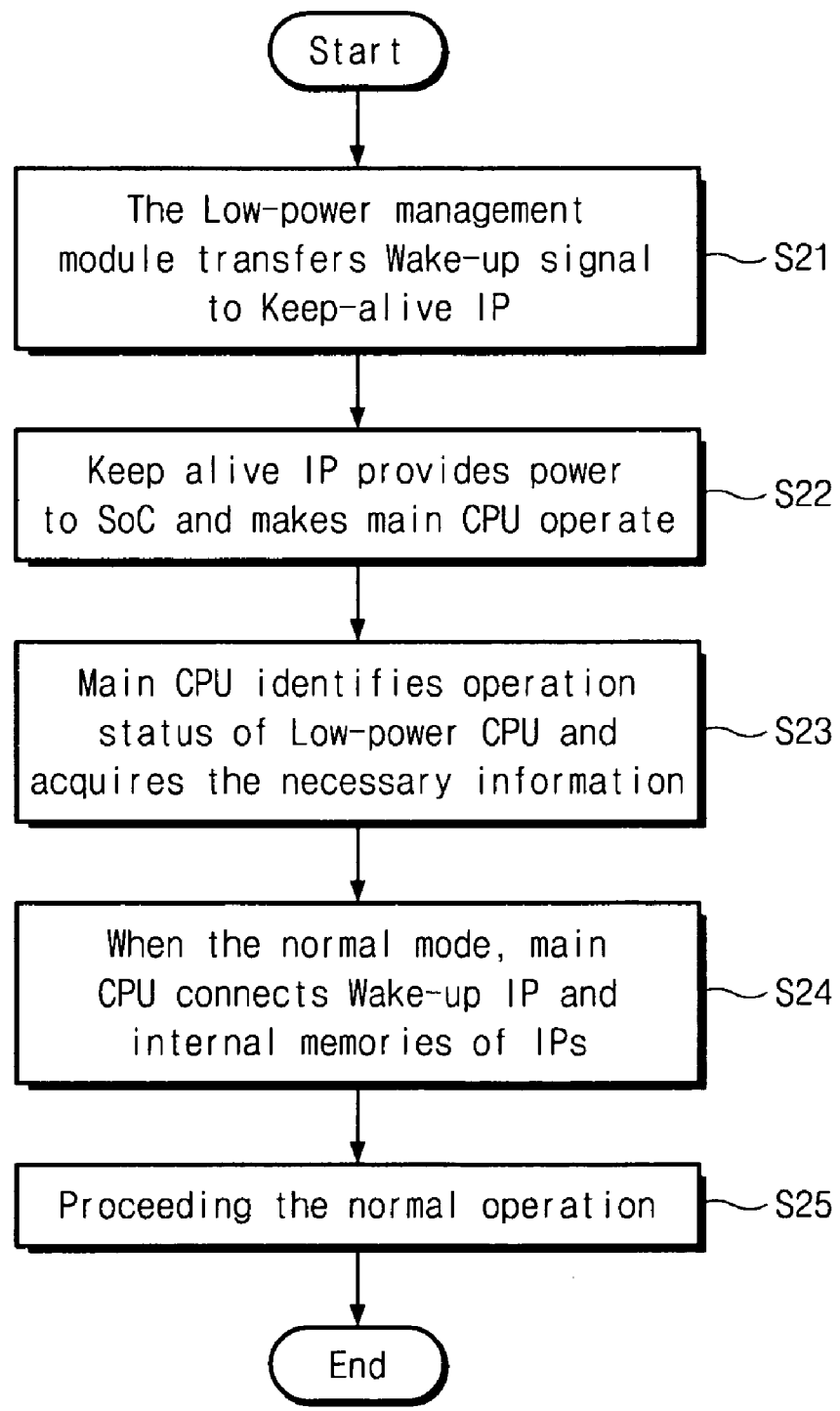
FIG. 7 is a flowchart describing a wake-up data transfer operation of a system-on-chip in FIG. 1.

FIG. 7 is a flowchart describing a wake-up data transfer operation of a system-on-chip in FIG. 1. Below, a wake-up data transfer operation of a system-on-chip 100 according to an embodiment of the inventive concept will be described with reference to FIGS. 1 to 5 and 7.

In step S21, a low-power management module 131 may send a wake-up signal to a keepalive IP 135. In step S22, the keepalive IP 135 may power the system-on-chip 100 such that a main CPU 111 operates. In step S23, the main CPU 111 may check an operating state of a low-power CPU 131a to acquire necessary information. In the case where the system-on-chip is in a normal mode, in steps S24 and S25, the main CPU 111 may access a wake-up IP 135 and internal memories 136_1 to 136_N and a normal operation may be executed.

The main CPU 111 needs to check whether an operating state checked in step S23 is a boot-up process or a wake-up process. In case of the boot-up process, the main CPU 111 may ignore an operating state of the low-power CPU 131a. In case of the wake-up process, the main CPU 111 may read information stored before power-down.

It is possible to prevent static power consumption by using a small-sized low-power CPU, for example, the low-power CPU 131 shown in FIGS. 1-4 and a minimum bus, for example, the low-power management module bus shown in FIGS. 4 and 5, for connecting with the low-power CPU instead of a main CPU and a bus matrix during a power-save mode. Further, the low-power CPU uses an internal memory, not an external memory. For this reason, an additional memory is unnecessary. Thus, it is possible to maintain data in an external memory with a minimum power by maintaining the external memory at a sleep state, and to perform a boot-up operation rapidly at a wake-up condition.

The above-disclosed subject matter is to be considered illustrative of exemplary embodiments, and is not to be construed as being restrictive. The appended claims are intended to cover all such modifications, enhancements, and other embodiments, which fall within the true spirit and scope. Thus, to the maximum extent allowed by law, the scope is to be determined by the broadest permissible interpretation of the following claims and their equivalents, and shall not be restricted or limited by the foregoing detailed description.

What is claimed is:

1. A system-on-chip comprising:
  a power-off domain block including a main CPU; and
  a power-on domain block including a low-power CPU and a memory; wherein the memory is used as an auxiliary memory of the power-off domain block at a power-on mode and as a memory storing programs and data for the low-power CPU at a power-off model, wherein when the system-on-chip satisfies a power-down condition, programs and data to be used by the low-power CPU are copied to the memory of the power-on domain block, the power-off domain block is powered down, and the low-power CPU is booted up, and
  wherein the power-on domain block analyzes externally transferred data during a power-down state of the power-off domain block to substitutes an operation of the power-off domain block, based on an analyzed result of the externally transferred data.

2. The system-on-chip of claim 1, wherein interconnection between the power-down domain block and the power-on domain block is isolated at power-down.

3. The system-on-chip of claim 1, wherein the power-on domain block is powered constantly.

4. A system-on-chip comprising:
  a power-off domain block including a main CPU;
  a memory controller that controls an external memory responsive to a control of the main CPU;
  a plurality of intellectual properties that perform individual functions; an interrupt controller that transfers an interrupt generated by at least one of the plurality of intellectual properties, to the main CPU;
  a system bus that interconnects the main CPU, the memory controller, the plurality of intellectual properties, and the interrupt controller;
  a power-on domain block including a low-power management module having a low-power CPU that performs an operation of the main CPU during a power-off state:
  a wake-up intellectual property that analyzes data;
  a keepalive intellectual property that activates a power of the power-off domain block according to a result analyzed by the wake-up intellectual property; and
  internal memories used as an auxiliary memory of the power-off domain block at a power-on mode and as a memory storing programs and data for the low-power CPU at a power-off mode, wherein when the system-on-chip satisfies a power-down condition, programs and data to be used by the low-power CPU are copied to at least one of the internal memories, the power-off domain block is powered down, and the low-power CPU is booted up.

* * * * *